United States Patent [19]
Zickefoose

[11] 3,802,331
[45] Apr. 9, 1974

[54] ROTISSERIE
[75] Inventor: Samuel R. Zickefoose, Ames, Iowa
[73] Assignee: Iowa State University Research Foundation, Inc., Ames, Iowa
[22] Filed: July 5, 1972
[21] Appl. No.: 269,160

[52] U.S. Cl. .............................. 99/427, 99/443 R
[51] Int. Cl. ............................................ A47j 43/18
[58] Field of Search ...... 99/427, 443, 421 R, 421 P, 99/421 H, 421 HV; 74/722

[56] References Cited
UNITED STATES PATENTS
| 1,476,215 | 12/1923 | Pace | 99/421 P UX |
| 2,619,026 | 11/1952 | Scott | 99/443 R X |
| 3,125,015 | 3/1964 | Schlaegel | 99/421 P |
| 3,504,620 | 4/1970 | Gerhardt | 99/427 |

Primary Examiner—Robert W. Jenkins
Assistant Examiner—Arthur O. Henderson
Attorney, Agent, or Firm—Zarley, McKee and Thomte

[57] ABSTRACT

A rotisserie for a grill of the barbeque type is disclosed herein generally comprising a powered drive shaft which extends over the barbeque grill. First and second spaced apart support members are secured to the drive shaft and extend transversely with respect thereto. A first food basket is rotatably secured to and extends between the first ends of the first and second support members while a second food basket is rotatably secured to and extends between the second ends of the first and second support members. Interconnection means operatively interconnects the first and second food baskets and the drive shaft so that the baskets are rotated about their axes as the shaft revolves the baskets around the longitudinal axis of the shaft. The interconnection means is designed so that the opposite sides of each of the baskets are alternately subjected to the heat emanating from the grill.

7 Claims, 6 Drawing Figures

PATENTED APR 9 1974 3,802,331
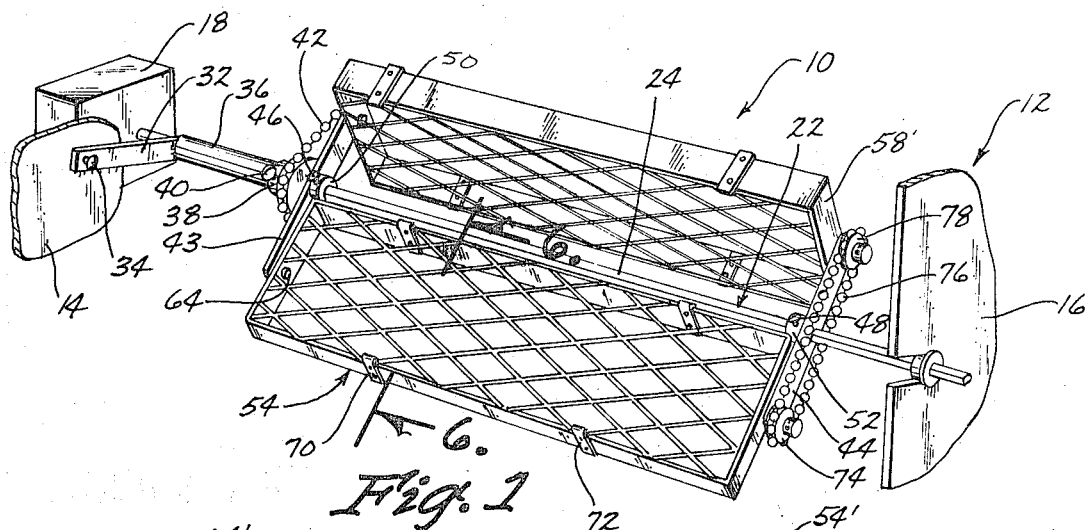
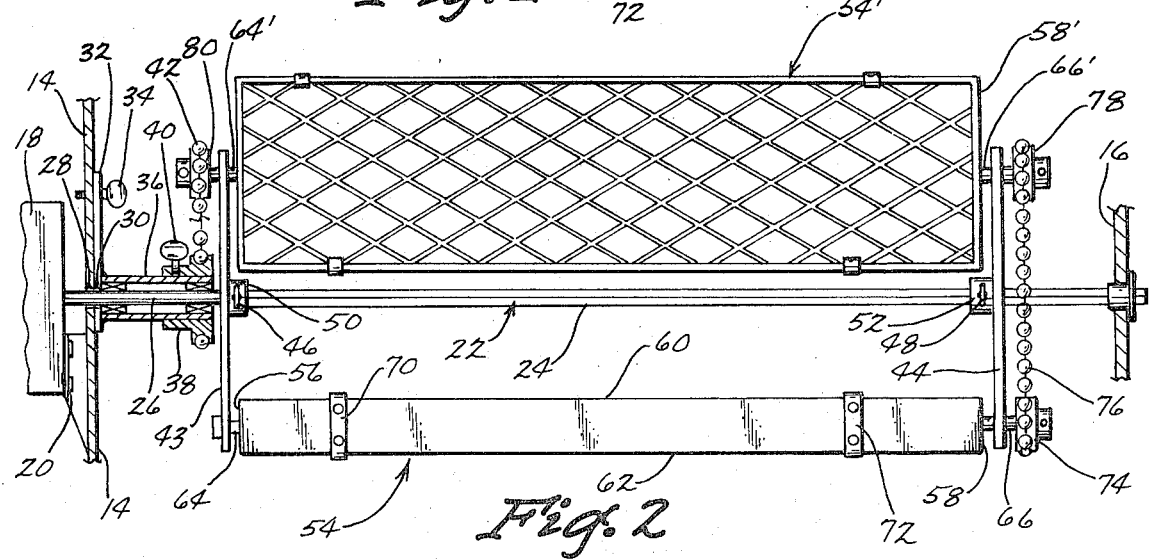
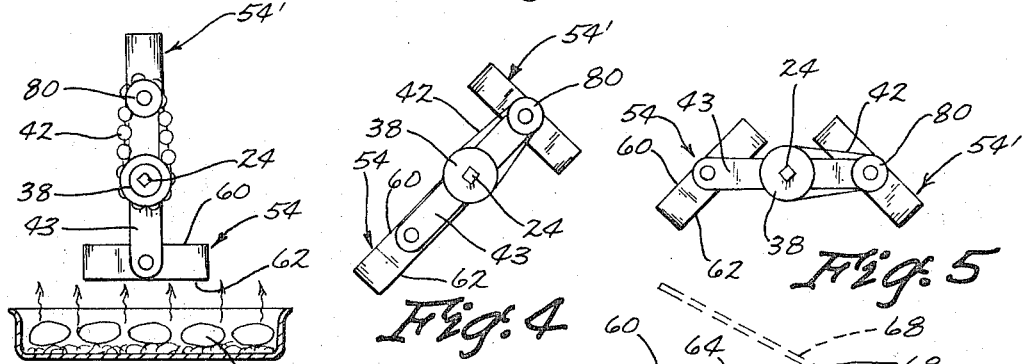

ROTISSERIE

Conventional barbeque grill rotisseries often employ a single food basket which is rotated about the longitudinal axis of the rotisserie drive shaft. Such baskets are not completely satisfactory since it is difficult to achieve "even" grilling. In other words, some of the food in the basket is overcooked while some of the food may be rare. Such uneven grilling is largely due to the fact that the food near the center of the basket is not subjected to as much heat as the food near the periphery of the basket. Attempts have been made to overcome this shortcoming by permitting the food to tumble in the basket but such tumbling often results in the food disintegrating and falling from the basket.

Therefore, it is a principal object of this invention to provide a rotisserie for a grill.

A further object of this invention is to provide a rotisserie for a grill of the barbeque type.

A further object of this invention is to provide a rotisserie for a grill of the barbeque type which comprises a pair of food baskets which are rotated about their axes as the rotisserie drive shaft revolves the baskets around the axis of the drive shaft.

A further object of this invention is to provide a rotisserie for a grill of the barbeque type wherein the opposite sides of the baskets are alternately positioned nearest the heat.

A further object of this invention is to provide a rotisserie for a grill of the barbeque type which is convenient to use and clean.

A further object of this invention is to provide a rotisserie for a grill of the barbeque type which achieves even grilling.

A further object of this invention is to provide a rotisserie which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a perspective view of the rotisserie of this invention:

FIG. 2 is a side view of the rotisserie of FIG. 1 with a portion thereof cut away to more fully illustrate the invention:

FIG. 3 is an end view of the rotisserie:

FIG. 4 is a view similar to FIG. 3 except that the rotisserie has been partially rotated from the position of FIG. 3:

FIG. 5 is a view similar to FIGS. 3 and 4 except that the rotisserie has been rotated; and FIG. 6 is an enlarged sectional view seen along lines 6—6 of FIG. 1.

The rotisserie of this invention is referred to generally by the reference numeral 10 and is designed to be used with conventional barbeque grills 12 such as that shown in the drawings. However, it should be understood that the rotisserie 10 could also be used in any environment wherein rotisseries are used such as in ovens or the like.

Grill 12 includes a pair of spaced apart wall members 14 and 16 which commonly form the hood portion of the grills. Motor 18 is supported on wall 14 by bolts 20 and has a drive shaft 22 extending horizontally therefrom. Drive shaft 22 is provided with a portion 24 having a square cross section and a portion 26 having a round cross section. As seen in FIG. 2, drive shaft 22 rotatably extends outwardly through an opening 28 formed in wall 14. Drive shaft 26 also extends through an opening 30 formed in arm 32. The other end of arm 32 is secured to wall 14 by screw 34. Sleeve 36 rotatably embraces the portion 26 of drive shaft 22 and is secured at its outer end to arm 32 by welding or the like. As seen in FIG. 2, sleeve 36 is provided with a pair of spaced apart bearings therein so that the drive shaft 22 may freely rotate with respect to the sleeve 36.

A gear or pulley 38 is secured to the inner end of sleeve 36 by wing nut 40 and is adapted to have chain 42 extending therearound. A pair of spaced apart support members 43 and 44 are selectively detachably mounted on the drive shaft 24 by means of wing bolts 46 and 48 threadably extending through the collars 50 and 52 respectively which are secured to the support members 43 and 44 respectively by welding or the like. Thus, rotation of the drive shaft 22 by the motor 18 causes the support members 43 and 44 to be rotated therewith.

The numeral 54 refers to a rectangular food basket having opposite ends 56 and 58 and opposite sides 60 and 62. Shaft stubs 64 and 66 extend outwardly from ends 56 and 58 respectively and rotatably extend through the ends of the support members 43 and 44 respectively as seen in FIG. 2. Basket 54 is provided with a mesh like covering which extends across its opposite sides. As seen in FIG. 6, basket 54 is provided with a cover element 68 pivotally secured thereto so that food may be inserted into the interior of the basket. Spring clips 70 and 72 are provided on the basket to yieldably maintain the cover element 68 in a closed position as illustrated in FIG. 6. When it is desired to open the cover element 68, it is simply necessary to deflect the spring clips 70 and 72. A gear or pulley 74 is secured to the outer end of shaft stub 66 for rotation therewith and is adapted to have a chain 76 extending therearound.

The numeral 54' refers to a rectangular food basket which is substantially identical to the food basket 44. Inasmuch as food basket 54' is substantially identical to basket 54, only basket 54 will be described in detail with "'" indicating identical structure on basket 54'. Shaft stubs 64' and 66' extend outwardly from the ends 56' and 58' respectively and rotatably extend through the ends of the support members 43 and 44. Gear or pulley 78 is secured to the outer end of shaft stub 66' and receives the chain 76 therearound. Gear or pulley 80 is secured to the outer end of shaft stub 64' and receives the chain 42 therearound as illustrated in FIG. 2. The pulleys 38 and 80 have a 1.5:1 ratio. Pulleys 78 and 74 have the same diameter as the pulley 80.

In operation, the food is placed in the baskets 54 and 54' through the cover elements 68 and 68'. The heat producing means 82 would ordinarily have been previously ignited or started. The motor 18 is energized to cause the rotation of the drive shaft 22. The rotation of drive shaft 22 causes the support members 42 and 43 to be rotated therewith which causes the baskets 54 and 54' to be revolved around the longitudinal axis of the shaft 22. As basket 54' is revolved around the longitudinal axis of shaft 22, the basket 54' is rotated about its axis defined by the shaft stubs 64' and 66' since the chain 42 extends around the pulley 38, which is fixed against rotation, and since the sleeve 36 is welded to the arm 32 which is secured to the wall 14 by screw 34. The basket 54 is also rotated about its axis defined by the shaft stubs 64 and 66 due to the chain 76 interconnecting the pulleys 78 and 74. The baskets 54 and 54' are rotated in the same amount since the pulleys 80, 78, and 74 have the same diameters. However, the 1.5:1 ratio of the pulleys 38 and 80 causes the baskets 54 and 54' to be rotated only 180° for each complete revolution of the drive shaft 22. This feature is partially illustrated in FIGS. 3, 4 and 5. In FIG. 3, side 62 of basket 54 is positioned about the heat producing means 82 in a substantially parallel relationship thereto. Rotation of the shaft 22 causes the baskets 54 and 54' to revolve about the axis of the shaft 22 as the shaft 22 moves the baskets from the position of FIG. 3 to the position of FIG. 4. Likewise, the baskets 54 and 54' are also rotated about their axes so that the side 60 of basket 54 will be positioned about the heat producing means 82 when the shaft 22 has made one complete revolution from the position of FIG. 3. Thus, the opposite sides of the baskets will be alternately positioned about the heat producing means 82 so that both sides of the food in the basket will be exposed to substantially the same amount of heat. The fact that the baskets are positioned substantially parallel to the heat producing means 82 as viewed in FIG. 3 insures that the food in the basket will be grilled evenly. It can be appreciated that if the basket 54 were inclined with respect to the heat producing means 82 in FIG. 3, the lowest portion of the basket would be exposed to the greatest amount of heat.

Thus it can be seen that a novel rotisserie for a barbeque grill has been provided which insures that the food in the baskets will be grilled evenly.

The alternate exposing of the food in the baskets insures that both sides of the food will be grilled evenly thereby resulting in a much more palatable product. Therefore, it can be seen that the rotisserie accomplishes at least all of its stated objectives.

I claim:

1. A rotisserie for a grill of the barbeque type having a heat producing means and a support means adjacent thereto, comprising, a powered drive shaft extending horizontally over the heat producing means, first and second spaced apart support members secured to said drive shaft, each of said support members being transversely disposed with respect to the longitudinal axis of said shaft and having first and second ends disposed on opposite sides of said shaft, a first food basket rotatably secured to and extending between said first ends of said first and second support members, a second food basket rotatably secured to and extending between said second ends of said first and second support members, said drive shaft causing said baskets to revolve therearound upon said drive shaft being rotated, interconnection means operatively interconnecting said first and second food baskets and said shaft for rotating said baskets about their axes as said shaft revolves said baskets around the longitudinal axis of said shaft, said interconnection means comprising a first gear means embracing said drive shaft adjacent said first support member, said first gear means being fixed against rotation with respect to said drive shafts, first and second shafts extending from opposite ends of said first food basket and rotatably extending through said first ends of said first and second support members, third and fourth shafts extending from opposite ends of said second food basket and rotatably extending through said second ends of said first and second support members, a second gear means secured to said first shaft for rotation therewith, a first chain means extending around said first and second gear means, a third gear means secured to said second shaft for rotation therewith, a fourth gear means secured to said fourth shaft for rotation therewith, and a second chain means extending around said third and fourth gear means.

2. The rotisserie of claim 1 wherein said first and second gear means have a 1.5:1 ratio, said third and fourth gear means having diameters equal to said second gear means.

3. A rotisserie for a grill of the barbeque type having a heat producing means and a support means adjacent thereto, comprising, a powered drive shaft extending horizontally over the heat producing means, first and second spaced apart support members secured to said drive shaft, each of said support members being transversely disposed with respect to the longitudinal axis of said shaft and having first and second ends disposed on opposite sides of said shaft, a first food basket rotatably secured to and extending between said first ends of said first and second support members, a second food basket rotatably secured to and extending between said second ends of said first and second support members, said drive shaft causing said baskets to revolve therearound upon said drive shaft being rotated, interconnection means operatively interconnecting said first and second food baskets and said shaft for rotating said baskets about their axes as said shaft revolves said baskets around the longitudinal axis of said shaft, said interconnection means causing each of said baskets to be orientated 180°, with respect to its initial position, for each revolution of said shaft.

4. A rotisserie for a grill of the barbeque type having a heat producing means and a support means adjacent thereto, comprising, a powered drive shaft extending horizontally over the heat producing means, first and second spaced apart support members secured to said drive shaft, each of said support members being transversely disposed with respect to the longitudinal axis of said shaft and having first and second ends disposed on opposite sides of said shaft, a first food basket rotatably secured to and extending between said first ends of said first and second support members, a second food basket rotatably secured to and extending between said second ends of said first and second support members, said drive shaft causing said baskets to revolve therearound upon said drive shaft being rotated, interconnection means operatively interconnecting said first and second food baskets and said shaft for rotating said baskets about their axes as said shaft revolves said baskets around the longitudinal axis of said shaft, each of said baskets being rectangular and having opposite sides, said interconnection means causing each of said baskets to be orientated 180°, with respect to its initial position, for each revolution of said shaft.

5. The rotisserie of claim 4 wherein said interconnection means alternately positions said baskets substantially parallel to said heat producing means.

6. A rotisserie for a grill of the barbeque type having a heat producing means and a support means adjacent thereto, comprising, a powered drive shaft extending horizontally over the heat producing means, first and second spaced apart support memers secured to said drive shaft, each of said support members being transversely disposed with respect to the longitudinal axis of said shaft and having first and second ends disposed on opposite sides of said shaft, a first food basket rotatably secured to and extending between said first ends of said first and second support members, a second food basket rotatably secured to and extending between said second ends of said first and second support members, said drive shaft causing said baskets to revolve therearound upon said drive shaft being rotated, interconnection means operatively interconnecting said first and second food baskets and said shaft for rotating said baskets about their axes as said shaft revolves said baskets around the longitudinal axis of said shaft, said baskets being substantially rectangular in shape, said interconnection means maintaining said baskets in a substantially horizontal plane as they pass adjacent to said heat producing means.

7. The rotisserie of claim 6 wherein said interconnection means causes said baskets to rotate substantially 180° for each revolution of said shaft.

* * * * *